United States Patent
Heidemeyer et al.

(10) Patent No.: US 11,204,004 B2
(45) Date of Patent: Dec. 21, 2021

(54) SYSTEM AND METHOD FOR STORING AND SUPPLYING WATER TO AN INTERNAL COMBUSTION ENGINE OF A MOTOR VEHICLE

(71) Applicant: KAUTEX TEXTRON GMBH & CO. KG, Bonn (DE)

(72) Inventors: Timm Heidemeyer, Cologne (DE); Hartmut Wolf, Koenigswinter (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 395 days.

(21) Appl. No.: 16/076,968

(22) PCT Filed: Aug. 2, 2016

(86) PCT No.: PCT/EP2016/068469
§ 371 (c)(1),
(2) Date: Aug. 9, 2018

(87) PCT Pub. No.: WO2017/137100
PCT Pub. Date: Aug. 17, 2017

(65) Prior Publication Data
US 2019/0040819 A1 Feb. 7, 2019

(30) Foreign Application Priority Data

Feb. 9, 2016 (DE) ...................... 10 2016 201 942.2

(51) Int. Cl.
*F02M 25/022* (2006.01)
*F02M 25/025* (2006.01)
(Continued)

(52) U.S. Cl.
CPC ....... *F02M 25/0224* (2013.01); *B01D 15/362* (2013.01); *B01D 15/363* (2013.01);
(Continued)

(58) Field of Classification Search
CPC .......... F02M 25/0224; F02M 25/0222; F02M 25/025; F02D 41/0025; B01D 15/362;
(Continued)

(56) References Cited

U.S. PATENT DOCUMENTS 3,250,704 A * 5/1966 Levendusky ............. C02F 1/42
210/686
3,444,079 A * 5/1969 Bowers .................... B01J 41/00
210/685
(Continued)

FOREIGN PATENT DOCUMENTS

FR 2504984 11/1982
GB 2109457 6/1983
(Continued)

OTHER PUBLICATIONS

English translation of International Preliminary Report on Patentability dated May 31, 2018, received in corresponding PCT Application No. PCT/EP2016/068469.
(Continued)

*Primary Examiner* — Hung Q Nguyen
(74) *Attorney, Agent, or Firm* — Grossman, Tucker, Perreault & Pfleger, PLLC

(57) ABSTRACT

A system for storing and supplying water to an internal combustion engine of a motor vehicle with a reservoir (1) for the water, with at least a delivery pump (5) for the water, and with at least a pipeline system comprising at least a feed line (4) to a consumer which is preferably designed in the form of at least a metering unit, and at least a return line (9) into the reservoir (1) as well as with means for demineralizing the water which are disposed inside the reservoir (1) or in the pipeline system.

15 Claims, 2 Drawing Sheets

(51) Int. Cl.
  *F02B 47/02* (2006.01)
  *F02D 41/00* (2006.01)
  *B01D 15/36* (2006.01)
  *C02F 1/42* (2006.01)
  *C02F 101/10* (2006.01)
  *C02F 103/02* (2006.01)

(52) U.S. Cl.
  CPC ............... *C02F 1/42* (2013.01); *F02B 47/02* (2013.01); *F02D 41/0025* (2013.01); *F02M 25/025* (2013.01); *F02M 25/0222* (2013.01); *C02F 2001/427* (2013.01); *C02F 2101/10* (2013.01); *C02F 2103/02* (2013.01)

(58) Field of Classification Search
  CPC .... B01D 15/363; C02F 1/42; C02F 2001/427; C02F 2101/10; C02F 2103/02; F02B 47/02
  See application file for complete search history.

(56) References Cited

U.S. PATENT DOCUMENTS

| | | | | |
|---|---|---|---|---|
| 3,831,754 | A * | 8/1974 | Heskett | C02F 1/008 210/676 |
| 4,368,123 | A * | 1/1983 | Stanley | C02F 1/003 210/269 |
| 4,430,226 | A * | 2/1984 | Hegde | B01J 47/04 159/DIG. 23 |
| 4,913,808 | A * | 4/1990 | Haque | C02F 1/283 210/93 |
| 5,073,268 | A * | 12/1991 | Saito | C02F 1/20 210/638 |
| 5,125,366 | A | 6/1992 | Hobbs | |
| 5,149,437 | A * | 9/1992 | Wilkinson | C02F 1/505 210/665 |
| 5,199,386 | A * | 4/1993 | Hubbard | F02B 47/02 123/25 E |
| 5,464,532 | A * | 11/1995 | Nowlin | C02F 1/42 210/190 |
| 6,698,387 | B1 * | 3/2004 | McFarland | F02B 47/02 123/25 A |
| 7,013,845 | B1 | 3/2006 | McFarland et al. | |
| 7,284,507 | B2 * | 10/2007 | Sundholm | B05B 12/04 123/25 A |
| 7,409,927 | B2 | 8/2008 | Wenderoth et al. | |
| 2003/0168025 | A1 | 9/2003 | Lesniak | |
| 2006/0266307 | A1 | 11/2006 | Mezheritsky et al. | |
| 2007/0001026 | A1 | 1/2007 | Lecheler et al. | |
| 2008/0087597 | A1 * | 4/2008 | Johann | B01J 47/024 210/232 |
| 2008/0271702 | A1 | 11/2008 | Tam | |
| 2011/0132827 | A1 * | 6/2011 | Yoden | B01D 63/02 210/202 |
| 2014/0138318 | A1 * | 5/2014 | Gensbittel | C02F 1/42 210/662 |

FOREIGN PATENT DOCUMENTS

| | | | |
|---|---|---|---|
| GB | 2357318 A | * | 12/2000 |
| GN | 101782031 | | 7/2010 |
| JP | 2004-050056 | | 2/2004 |
| JP | 2005-530945 | | 10/2005 |
| JP | 2007203300 | | 8/2007 |
| JP | 2012-223700 | | 11/2012 |
| JP | 2015188848 | | 11/2015 |
| WO | 02/33242 | | 4/2002 |

OTHER PUBLICATIONS

English translation of International Search Report dated Oct. 18, 2016, received in corresponding PCT Application No. PCT/EP2016/068469.
Office Action from related Indian Appln. No. 201827031882, dated Dec. 2, 2020. English translation incorporated therein.
Office Action from related Chinese Appln. No. 2016800814952, dated Mar. 3, 2021. English translation incorporated therein.
Luo, "Automotive electronic control", China Communication Press, May 31, 1999, pp. 136-137. Concise explanation of relevancy can be found on the Mar. 3, 2021 Chinese Office Action submitted herewith.
Zhao et al., "Post-treatment technology of vehicle diesel engine", China Science and Technology Press, Nov. 30, 2010, pp. 82-83. Concise explanation of relevancy can be found on the Mar. 3, 2021 Chinese Office Action submitted herewith.

* cited by examiner

SYSTEM AND METHOD FOR STORING AND SUPPLYING WATER TO AN INTERNAL COMBUSTION ENGINE OF A MOTOR VEHICLE

FIELD

The invention relates to a system for storing and supplying water to an internal combustion engine of a motor vehicle, having at least one delivery pump for the water and at least one pipeline system comprising a feed line to a consumer and at least a return line into the reservoir.

BACKGROUND

With water injection tank systems, it is mandatory to use deionized or demineralized water with a very low conductance (less than 10 µs/cm). Minerals contained in water clog up valves, pumps and injectors comparatively quickly. It is therefore necessary to fill reservoirs, which are intended to receive water, with deionized or demineralized water. This is expensive and comparatively inconvenient particularly for the end customer.

SUMMARY

The object of the invention is therefore to provide a system for storing and supplying water to an internal combustion engine of a motor vehicle which can also be filled with normal tap water.

From the point of view of the invention a system for storing and supplying water to an internal combustion engine of a motor vehicle is provided with a reservoir for the water, having at least one delivery pump for the water and at least one pipeline system comprising at least a feed line to a consumer, which is preferably designed in the form of at least one metering unit, and at least one return line into the reservoir as well as having means for demineralizing the water wherein the means for demineralizing the water are arranged inside the reservoir or on the reservoir or in the pipeline system or communicating with the pipeline system.

The system according to the invention also comprises such configurations in which the delivery or feed line is not attached directly to the consumer or to a distributor mounted in front of several consumers, but the delivery comprises by way of example a branch to a supply line. In this case the means for demineralizing the water can be arranged in the supply line.

Consumers in the sense of the present invention can be one or more metering units for a water injection system on an internal combustion engine, by way of example a passenger vehicle. The metering units can comprise one or more injection nozzles.

In an expedient variation of the invention the means for demineralizing the water are connected directly in front of a supply connection of the reservoir or a line leading to the consumer. Basically within the scope of the invention the arrangement of the means for demineralizing the water inside the return line is possible and expedient.

A preferred variation of the system according to the invention is characterized in that at least one filter, preferably a mixed bed filter, is provided as means for demineralizing the water.

An exchangeable filter cassette can be provided by way of example as a filter mounted inside the reservoir.

As an alternative an exchangeable filter cartridge can be provided as a filter which is arranged inside the pipeline system or is attached to the pipeline system.

In an advantageous variation of the system according to the invention it is proposed that the filter cartridge is arranged in the feed line in the flow direction of the delivery, preferably in front of the delivery pump.

The filter cartridge can basically also be connected in after the delivery pump. This is particularly advantageous therefore because the delivery pump can then better overcome the resistance of the filter cartridge. One skilled in the art will understand that a resistance in a pipeline system can be better compensated on the pressure side of the pump than on the suction side of the pump.

The filter cartridge can be attached to the reservoir directly on the outside thereof wherein with this variation the feed line is more expediently connected to the filter cartridge.

In an advantageous configuration of the system according to the invention it is proposed that the filter cartridge comprises a housing with a filter pack through which water can flow.

The mixed bed filter of the system according to the invention more expediently comprises at least one mixed bed resin.

The mixed bed filter can be formed by way of example as a multi-chamber filter, as a sandwich filter or in the form of one or more membranes connected in series, or alternatively in the form of a mixed bed resin which contains both cation and also anion exchange resins.

The mixed bed resin is preferably selected from a group of resins comprising acidic cation exchangers and basic anion exchangers of the type $CA^{2+}$, $NI^{2+}$, $MG^{2+}$, $SO_4^{2-}$, $HSO_4^-$, and $NO_3^-$.

The invention further relates to a method for supplying water to the internal combustion engine of a motor vehicle by using a system comprising a reservoir for the water, at least one delivery pump for the water and at least one pipeline system comprising at least a feed line to a consumer, preferably in the form of at least one metering unit, and at least one return line into the reservoir, wherein the water for supplying to the consumer is demineralized before or during its delivery.

More particularly the water is demineralized before supplying to the consumer.

It is particularly preferred if the method is carried out by using the system described above.

The method according to the invention also comprises the metered and intermittent supply of demineralized water to one or more consumers. In this case the means for demineralizing the water communicate with the pipeline system, but these are not necessarily arranged inside a feed line or return line of the pipeline system, but by way of example at the output side of the delivery pump in a supply line to the consumer.

BRIEF DESCRIPTION OF THE DRAWINGS

The invention will now be explained below with reference to four exemplary embodiments illustrated in the drawings. In the drawings.

DETAILED DESCRIPTION

Figure 1:
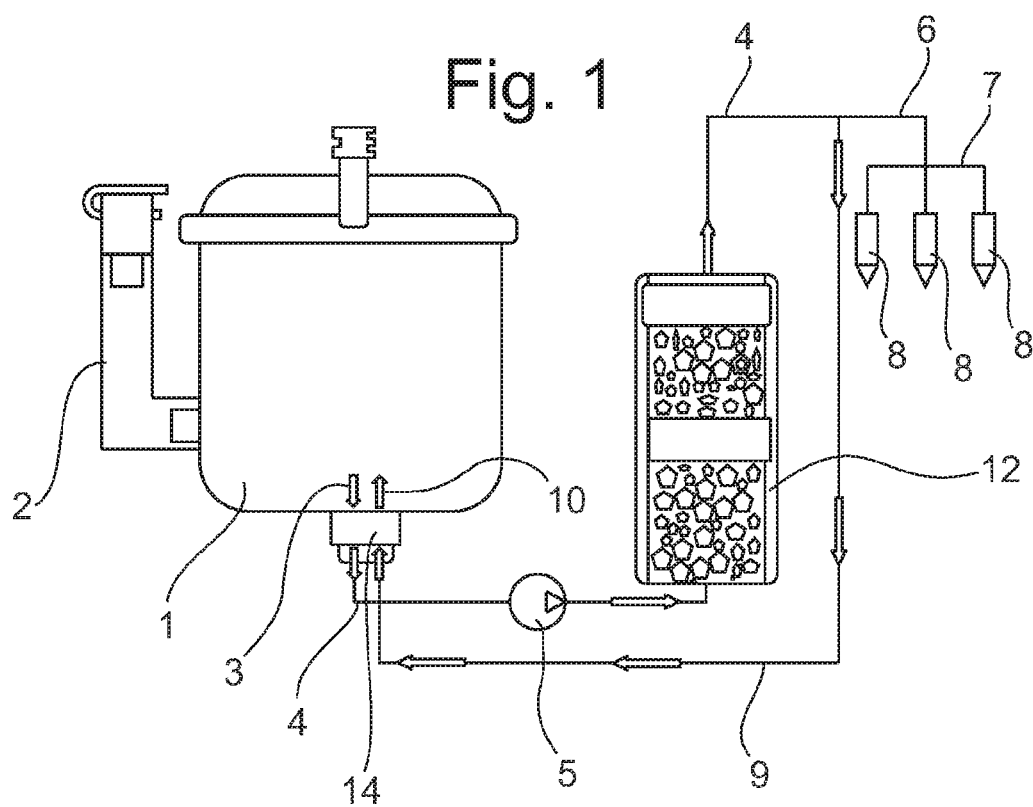
FIG. 1 shows a water injection system according to a first exemplary embodiment of the invention.

The system diagrammatically illustrated in FIG. 1 comprises a reservoir 1 for water with a filling pipe 2 with means for ventilating the reservoir 1 as well as with means for detecting the filling level. The reservoir 1 is attached to a feed line 4 via a delivery connection 3. A delivery pump 5 is arranged in the feed line 4 and supplies water via a supply line 6 to a distributor 7 to which in turn injection nozzles 8 are attached as metering units or as the consumer.

The system furthermore comprises a return line 9 with which water not removed by the injection nozzles 8 can be supplied back into the reservoir 1 via a return connection 10. A multiway valve 14 is connected in front of the return connection 10 via which the pipeline system, comprising the feed line 4 and a return line 9 as well as where applicable for service purposes the reservoir 1, can be emptied. The return connection 10 is provided inside the volumetric area of the reservoir 1 with a throttle which enables relaxing of the pressurized return into the reservoir 1.

A conductivity detector (not shown in further detail) is arranged in the reservoir and detects the conductivity of the water located in the reservoir 1 and produces a corresponding warning signal when required.

With the exemplary embodiment according to FIG. 1 an exchangeable filter cartridge 12 is provided in the feed line 4 behind the delivery pump 5, thus on the pressure side of the delivery pump 5, and is filled with a mixed bed resin which comprises by way of example strongly basic anions and strongly acidic cations, which take up the ions in the pipe water so that the water located in the reservoir 1 is desalinated as it is supplied with the delivery pump 5 and removed from the reservoir 1.

The mixed bed resin provided in the filter cartridge 12 can be a granular material. This can be by way of example a single-use mixed bed resin which is known in the trade by the trade name Resinex and acts as an ion exchanger.

Figure 2:
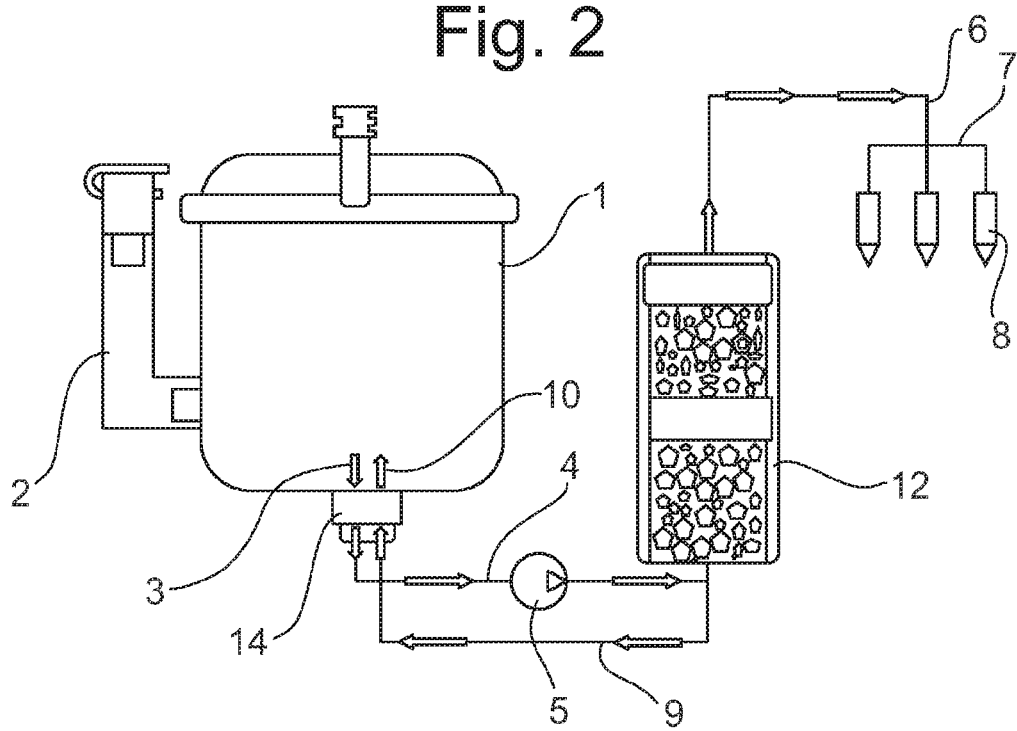
FIG. 2 shows a water injection system according to a second exemplary embodiment of the invention.

An alternative configuration of the system according to the invention is shown in FIG. 2. In FIG. 2 the component parts which correspond function-wise to those of the exemplary embodiment according to FIG. 1 are provided with the same reference numerals.

The exemplary embodiment according to FIG. 2 differs from that according to FIG. 1 in that the filter cartridge 12 is inserted interchangeably in the supply line 6 of the system. The filter cartridge 12 is then likewise connected to the outlet side of the delivery pump 5.

With the system illustrated in FIG. 2 it is proposed to supply the water intermittently through the filter cartridge 12 in metered amounts to the injection nozzles 8. The filter cartridge 12 is then not integrated into the circuit, i.e. into the feed line 4 and into the return line 9. The filter cartridge 12 is equally arranged connected in front of the injection nozzles 8 in the supply line 6.

Figure 3:
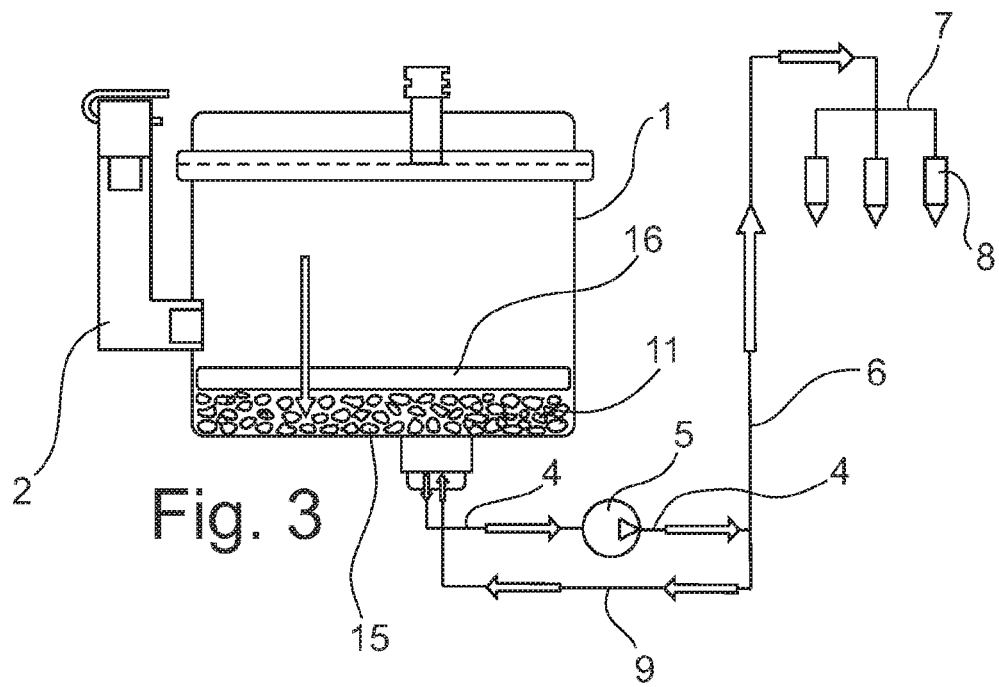
FIG. 3 shows a water injection system according to a third exemplary embodiment of the invention.

The exemplary embodiment of the invention illustrated in FIG. 3 differs from that according to FIGS. 1 and 2 in that an exchangeable filter cassette or filter pack 11 is arranged as a filter inside the reservoir 1. The filter pack 11 can comprise a mixed bed 15 and at least a filter medium 16 positioned in front of the mixed bed, i.e. arranged upstream thereof. The filter medium 16 can be formed as a woven or packed filter medium, as a filter fleece or the like.

The filter pack 11 or mixed bed 15 and the filter medium 16 are more expediently arranged on and covering the bottom of the reservoir 1. The filter pack 11 is preferably arranged on the suction side of the delivery pump 5.

Figure 4:
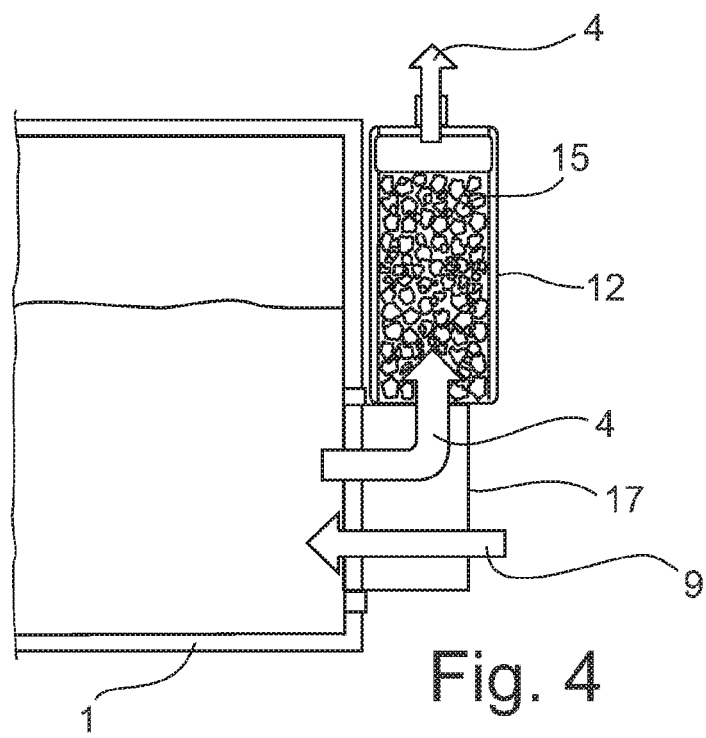
FIG. 4 shows a water injection system according to a fourth exemplary embodiment of the invention.

A further advantageous variation of the system according to the invention is shown in FIG. 4. The variation of the system illustrated in FIG. 4 differs from those variations which are described in FIGS. 1 to 3, in that the filter cartridge 12 is arranged on a side wall of the reservoir 1 and is attached there directly to a connection module 17 which closes the reservoir. The connection module 17 can be provided by way of example as a multi-way valve for controlling the discharge of fluid from the reservoir 1 and/or for emptying and/or for filling the pipeline system. With this variation of the system the filter cartridge 12 is arranged on the suction side of the delivery pump 5, which is not shown.

The filter cartridge 12 according to the exemplary embodiment according to FIGS. 2 and 4 can likewise comprise a mixed bed 15, like the filter cartridge 12 according to the exemplary embodiment according to FIG. 1.

REFERENCE NUMERAL LIST

1 Reservoir
2 Filler pipe
3 Delivery connection
4 Feed line
5 Delivery pump
6 Supply pipe
7 Distributor
8 Injection nozzles
9 Return line
10 Return connection
11 Filter pack
12 Filter cartridge
13 Insert
14 Multi-way valve
15 Mixed bed
16 Filter medium
17 Connection module

What is claimed is:

1. A motor vehicle system to store water and supply the water to an internal combustion engine of a motor vehicle, comprising:
a reservoir for the water,
at least a delivery pump for the water,
at least a pipeline system comprising at least a feed line to a consumer,
at least a return line into the reservoir, and
a water demineralizer, wherein the water demineralizer is arranged inside the reservoir or on the reservoir, and
wherein the water demineralizer comprises at least one filter, and the at least one filter is arranged in the feed line or the return line.

2. The system as claimed in claim 1, wherein the water demineralizer is arranged in front of a delivery connection of the reservoir or is arranged in the feed line or in a supply line to the consumer.

3. The system as claimed in claim 1, wherein the at least one filter comprises an exchangeable filter.

4. The system as claimed in claim 1, wherein the at least one filter is arranged in the feed line.

5. The system as claimed in claim 1, wherein the at least one filter is arranged in the return line.

6. The system as claimed in claim 1, wherein the at least one filter comprises a mixed bed filter.

7. The system as claimed in claim 6, wherein the mixed bed filter comprises at least one mixed bed resin.

8. The system as claimed in claim 7, wherein the mixed bed resin comprises cation and anion exchange resins.

9. The system as claimed in claim 7, wherein the mixed bed resin is selected from a group of resins comprising acidic cation exchangers and basic anion exchangers of the type CA2+, NI2+, MG2+, SO42−, HSO4−, and NO3−.

10. The system as claimed in claim 6, wherein the mixed bed filter is formed as a multi-chamber filter or multi-membrane filter.

11. The system as claimed in claim 1, wherein the consumer comprises at least one metering unit.

12. A method to supply water to an internal combustion engine of a motor vehicle, comprising:
    providing a system to store the water and supply the water to the internal combustion engine, comprising
    a reservoir for the water,
    at least a delivery pump for the water,
    at least a pipeline system comprising at least a feed line to a consumer,
    at least a return line into the reservoir, and
    a water demineralizer, wherein the water demineralizer is arranged inside the reservoir or on the reservoir, and
    wherein the water demineralizer comprises at least one filter, and the at least one filter is arranged in the feed line or the return line, and
    demineralizing the water with the filter.

13. The method as claimed in claim 12, wherein the water is demineralized before supplying to the consumer.

14. The method as claimed in claim 12, wherein the at least one filter is arranged in the feed line.

15. The method as claimed in claim 12, wherein the at least one filter is arranged in the return line.

* * * * *